United States Patent
Grzina et al.

[11] 3,910,843
[45] Oct. 7, 1975

[54] THICKENER MECHANISM

[75] Inventors: Anthony Grzina, Artarmon, Australia; John Henry Ephraim Fedeler, Southbury, Conn.

[73] Assignee: Warman Equipment (International) Ltd., Artarmon, Australia

[22] Filed: Dec. 21, 1973

[21] Appl. No.: 427,270

[30] Foreign Application Priority Data
Dec. 22, 1972 Australia............................ 1717/72

[52] U.S. Cl. ............................................... 210/531
[51] Int. Cl.² ........................................ B01D 21/06
[58] Field of Search ............ 210/523, 525, 528, 531

[56] References Cited
UNITED STATES PATENTS

| | | | |
|---|---|---|---|
| 1,434,597 | 11/1922 | Dorr | 210/528 X |
| 2,122,287 | 6/1938 | Kepper | 210/528 X |
| 2,122,385 | 6/1938 | Scott | 210/528 |
| 2,499,460 | 3/1950 | Chelminihi | 210/528 |
| 2,837,215 | 6/1958 | Chelminihi | 210/531 |
| 2,866,352 | 12/1958 | Scott | 210/528 UX |
| 3,465,888 | 9/1969 | Jgblin | 210/531 |
| 3,557,964 | 1/1971 | Qugst | 210/531 |

*Primary Examiner*—Theodore A. Granger
*Attorney, Agent, or Firm*—Waters, Schwartz & Nissen

[57] ABSTRACT

A thickener mechanism for a settling tank is provided in which separate rake arms with scraper blades sweep an outer and an inner annular area respectively of the tank. Connected with the rake arms for the outer annular area are cone scraper blades which keep the underflow solids in the centre of the tank in motion for ease of withdrawal. Although the two sets of rake arms and the cone scraper blades are rotated together, the rake arms for the inner area can be lifted to overcome obstacles while the cone scraper blades maintain their scraping action.

8 Claims, 8 Drawing Figures

THICKENER MECHANISM

The invention relates to thickener mechanisms for settling apparatus, such as for slurries, sludges, concentrates, tailings or the like, which are often referred to as settlers, thickeners, clarifiers or hydro separators.

Many designs of continuously operating thickeners are known in which rotary rake arms carrying rake blades are rotated about a vertical shaft through the slurry in a settling tank by a driving mechanism supported on a bridge structure, cage or centre column.

In some cases the continuously operating thickeners are equipped with a lifting mechanism, the purpose of which is to raise the entire rake arm structure to prevent damage to the mechanism when the settling solids become sufficiently dense to prevent the rake arms from rotating.

Other continuously operated thickeners are equipped with an arrangement of pivot points at the intersection of the rake arm structure with the vertical shaft or cage so that the outer end will rise in an arc about the pivot arrangement when the rake arm structure is prevented from travelling in its normal position through the slurry.

Generally the function of all rake arm structures is to physically position the rake blades into an operating position within the settling tanks and to move the assembly of rake blades about a vertical shaft or centre column.

The rake blades then move the settled solids to the centre of the tank so that the solids can be removed as underflow, for example by pumps. A cone in the centre of the tank serves as a transition from the relatively flat bottom to the underflow withdrawal pipes. Cone scrapers are attached to the rake arm structure and rotate with it to keep the underflow solids in motion for ease of withdrawal.

Arrangements are known for lifting the rake arm structure in the case of thickeners in which solids fed to the thickener are settling at a faster rate than they are being withdrawn with the underflow or when the settled solids tend to solidify. Heretofore such lifting mechanisms have been arranged to raise the entire rotating rake arm structure including the centre cone scrapers. However, when the cone scrapers are in the raised position solids can settle firmly in the cone section preventing withdrawal of underflow slurry by the pumps.

The invention, which will overcome this disadvantage is based on the known fact that larger and heavier solids settle well within the inner area of a thickener, the perimeter of which has a diameter of 25 to 40 percent of its total diameter. Smaller and lighter particles settle mostly in the outer area as the velocity of the liquid flowing towards an overflow weir decreases. The settling smaller and lighter solids seldom compact sufficiently to prevent the rake structure from rotating.

Based on the beforementioned considerations the invention is directed to a thickener mechanism of the central column type, in which the rake arm lifting mechanism operates only on an inner section of the rake arm structure in a region where the larger and heavier solids tend to settle, whereas the blades at the outer section of the rake arm structure as well as any cone scrapers which may be provided maintain their normal, lowered operational position.

Thus the scraping near the underflow pumps is not interrupted when the accumulation of heavy solids near the centre of the tank makes a raising of the inner rake blades necessary.

The thickener mechanism according to the invention, therefore, comprises a first cage supporting a first set of rake arms and being rotatable on said central column, driving means for said first cage, a second cage supporting a second set of raked arms, being rotatable with said first cage and being slidable relative to said first cage along its vertical axis, said first set of rake arms extending to the wall of said settling tank and supporting at their outer portions a plurality of scraper blades to cover the outer annular region of said tank, and said second set of rake arms being shorter than said first set and supporting a plurality of scraper blades to cover the inner region of said settling tank, and means to lift said second cage, when the scraper blades of said second set of rake arms encounter an obstacle on rotation of said cages.

The new arrangement increases the efficiency of the thickener as it permits continuous operation of the cone scrapers under all working conditions thus preventing any clogging up of the under flow pumps even when an accumulation of heavy solids may require a temporary lifting of the rake blades at the inner section of the rake arm structure.

One embodiment of the invention will now be described in more detail in connection with the drawings, in which.

Figure 1:
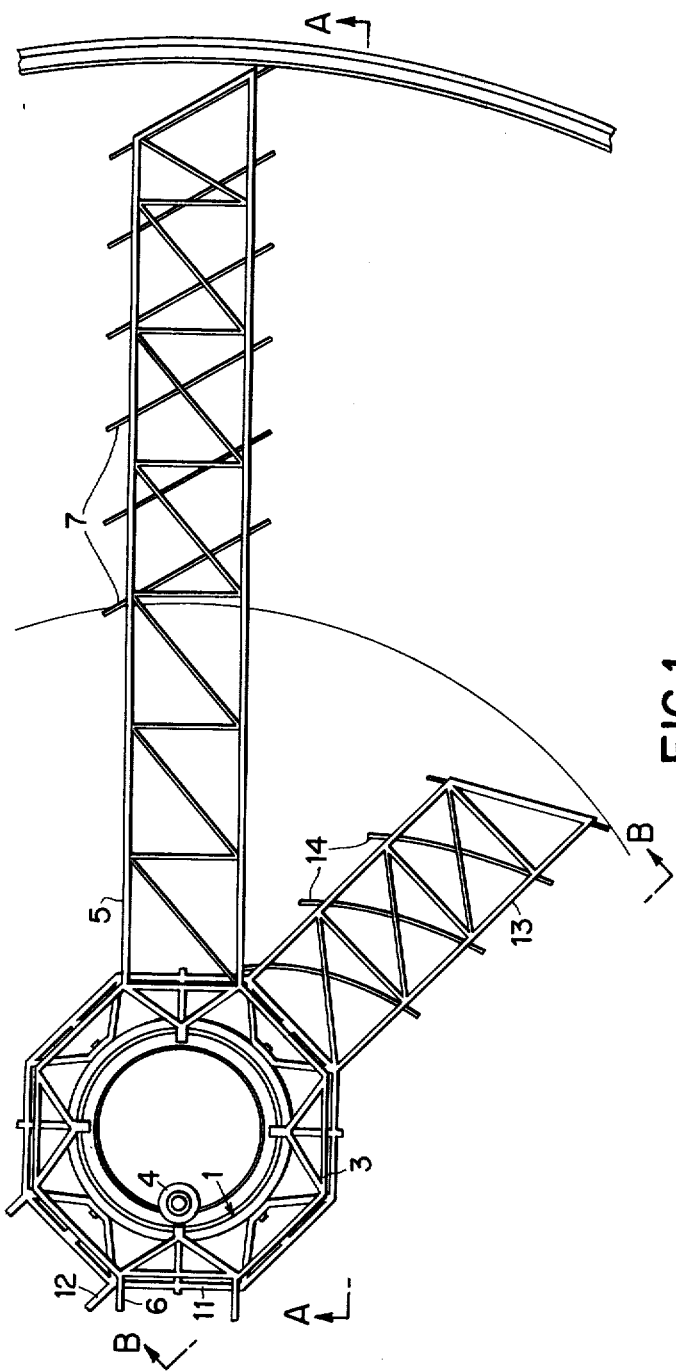
FIG. 1 shows a plan view of a thickener according to the invention.
Figure 2:
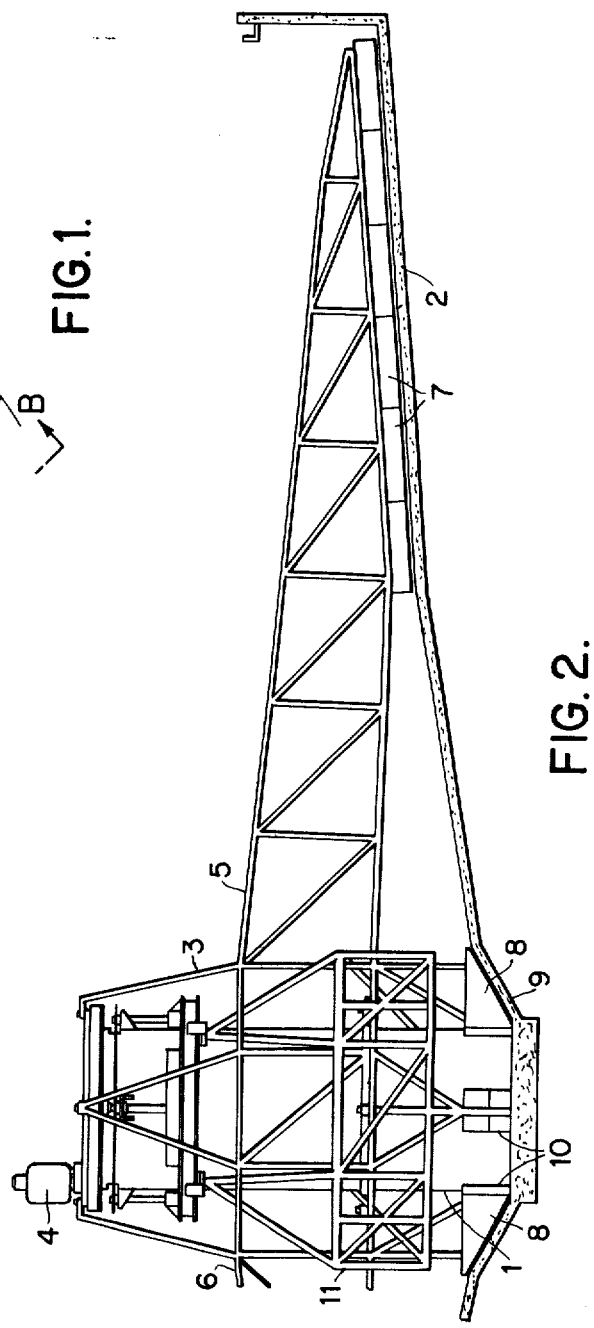
FIG. 2 is a side view of the same thickener seen in the plane A—A in FIG. 1.

In FIGS. 1 and 2 a centre column thickener is shown which has a centre column 1 mounted in the centre of the settling tank 2. The column 1 supports a cage 3 which is rotatably mounted on the column and is driven by a suitable driving mechanism (motor and gearing) 4.

The cage 3 carries two oppositely extending rake arms 5 and 6 extending towards the side wall of the tank 2 and carrying a plurality of scraper blades 7. These scraper blades, however, are only arranged on the outer part of the rake arms and scrape only over the outer annular part of the tank bottom.

The cage 3 further carries at its lower end a plurality, for example four, cone scraper blades 8 which sweep the conical centre part 9 of the tank 2, so that the solid material can be sucked by suitable underflow pumps through the suction parts 10.

The part of the tank between the conical part 9 and the annular outer part covered by the scraper blades 7 is the area which is most likely to provide obstructions to a scraping action and therefore, in accordance with the invention, the scraper blades for this area are mounted on separate arms so that they can be lifted if required without changing the scraping action of the blades 7 and the cone blades 8.

Figure 3:
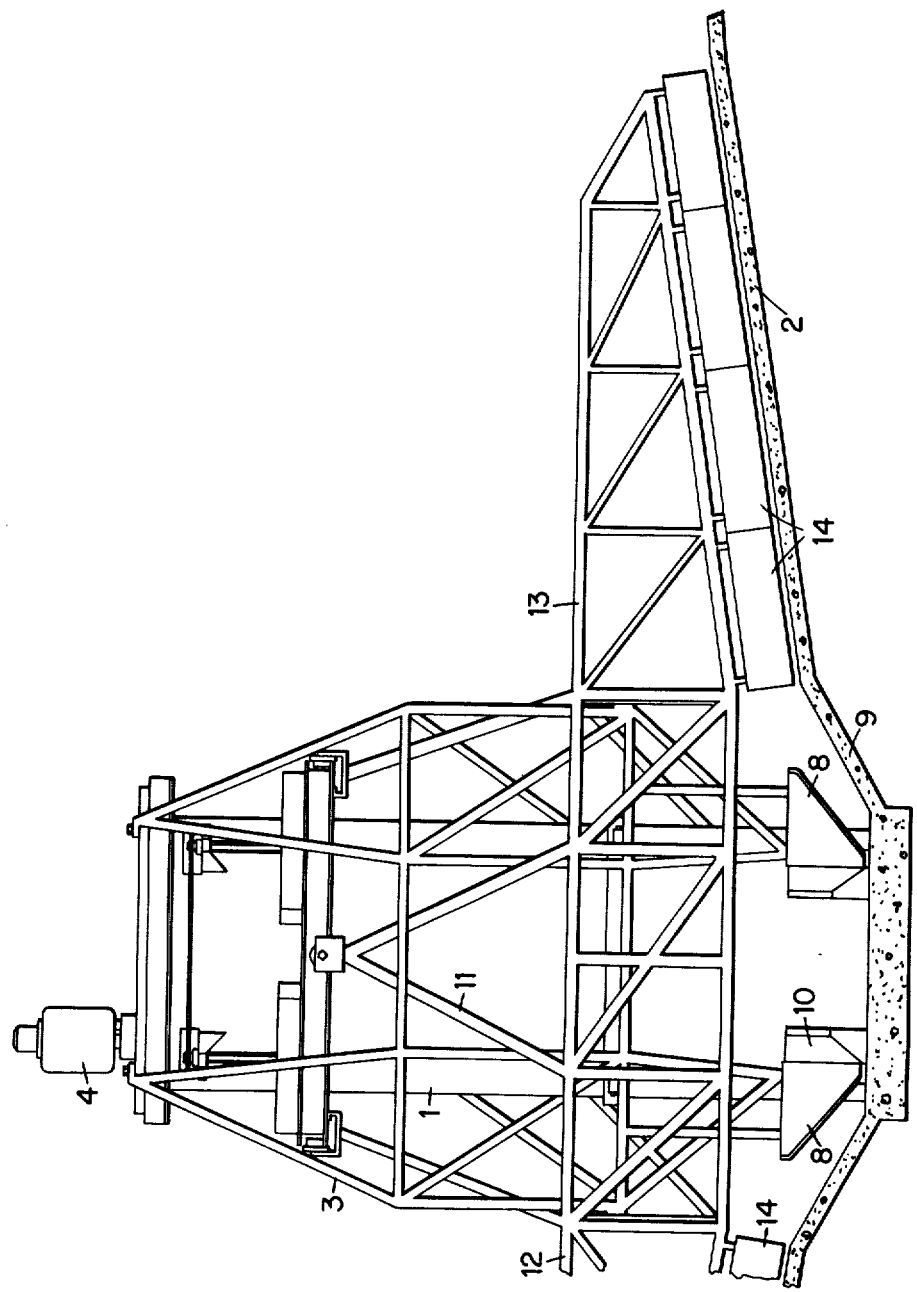
FIGS. 3 and 4 are side views of the same thickener seen in the plane B—B in FIG. 1, with the shorter rake arms lowered and lifted respectively.
Figure 4:
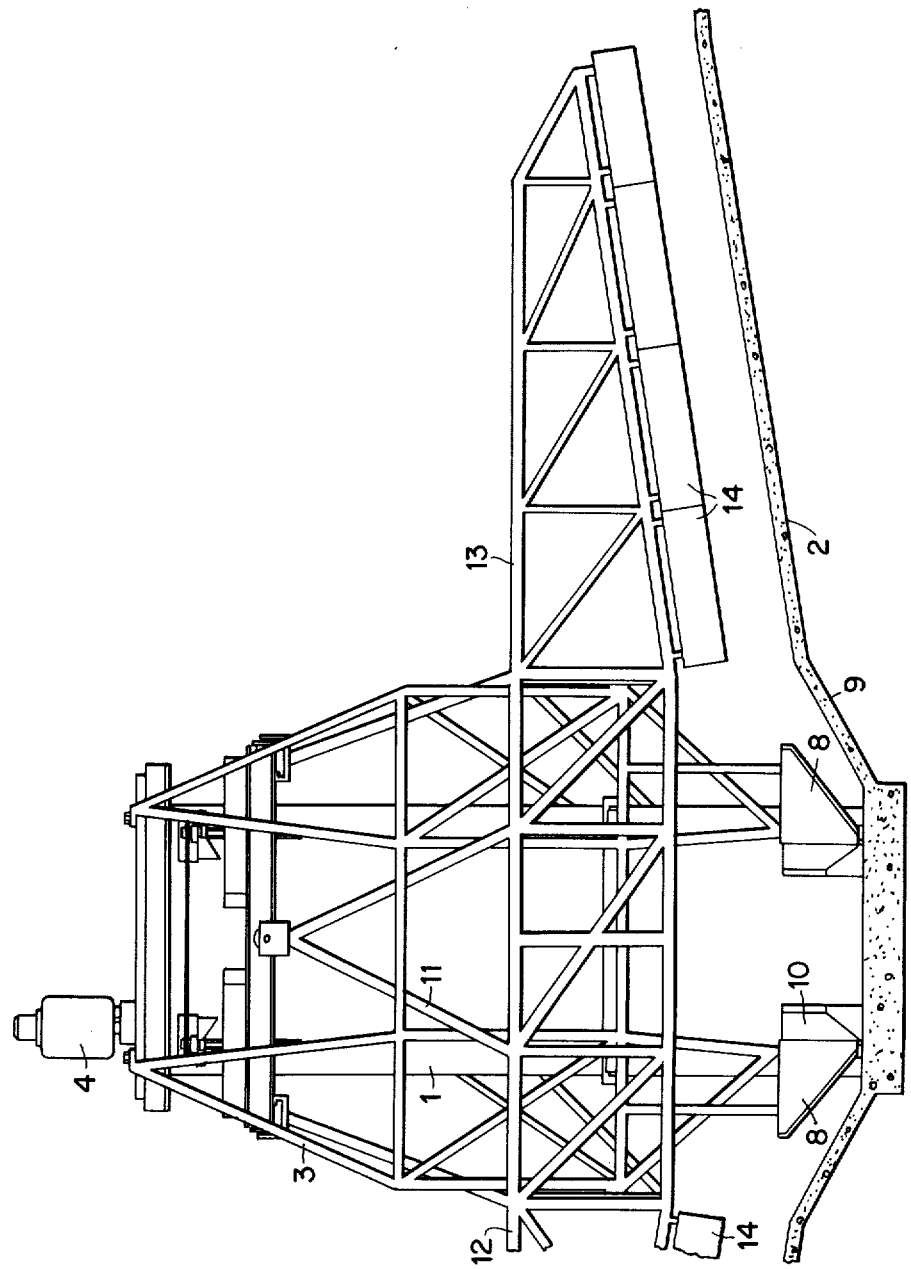

This is achieved by providing a lifting cage 11 which rotates with the cage 3 but can be moved in a vertical direction relative thereto. This lifting cage carries two oppositely extending rake arms 12 and 13 which are shorter than the rake arms 5 and 6 and may be angularly offset thereto by an angle between 30° and 90°. These short rake arms 12 and 13 are equipped with scraper blades 14 (FIG. 3) which sweep the part of the tank 1 between the scraper blades 7 and the cone blades 8. If these blades 14 meet any serious obstruction the lifting cage 11 can be lifted, as shown in FIG. 4 and described in more detail later on, while the cone scraper blades 8 and the rake arms carrying the outer scraper blades 7 continue their normal function thus preventing any build-up of material in the conical section 9 of the tank 2.

The construction and operation of the arrangement incorporating the lifting cage 11 will be more clearly perceived from the following description in connection with FIGS. 5 to 8.

The central column 1 with the underflow pump suction ports 10 encloses the underflow suction pump 15 and carries at its upper end the rotatable cage 3 which is driven by an electric motor and gearing device 4 via a main pinion 16 engaging a gear ring 17 with internal teeth. This gear ring, which is fixed to the cage 3 is supported by a crossed roller bearing 18 on the upper end of the stationary centre column 1.

To guide the lower part of cage 3 during rotation, the cage 3 has a plurality of wooden guide blocks 19, for example four, evenly distributed around the centre column 1, being radially adjustable to co-operate with a bearing ring 20 on the centre column.

The cage 3 carries, as mentioned above, the rake arms scraping the outer annular part of the tank. In addition the cage carries at its lower end the conical scraper blades 8 which move within the conical part 9 of the tank, thus preventing a clogging-up of the suction ports 10 leading to the underflow pump 15.

Rotating together with the cage 3, but axially movable thereto is the cage 11 which as mentioned earlier carries shorter rake arms for scraping the tank between the outer annular part and the central conical part.

This cage 11 is suspended from a height-adjustable circular monorail beam 21 by means of pairs of rollers 22 mounted by brackets 23 on the upper part of cage 11. In order to impart the rotating movement of cage 3 to cage 11 without obstructing the axial movement of the latter, the cage 3 is provided with a plurality of axially extending driving blocks 24, evenly distributed around its periphery and engaging corresponding grooved driving slides 25 arranged on the inside of cage 11. Thus irrespective of the relative axial position of the two cages 3 and 11, the latter cage will always be positively driven by the cage 3.

Figure 5:
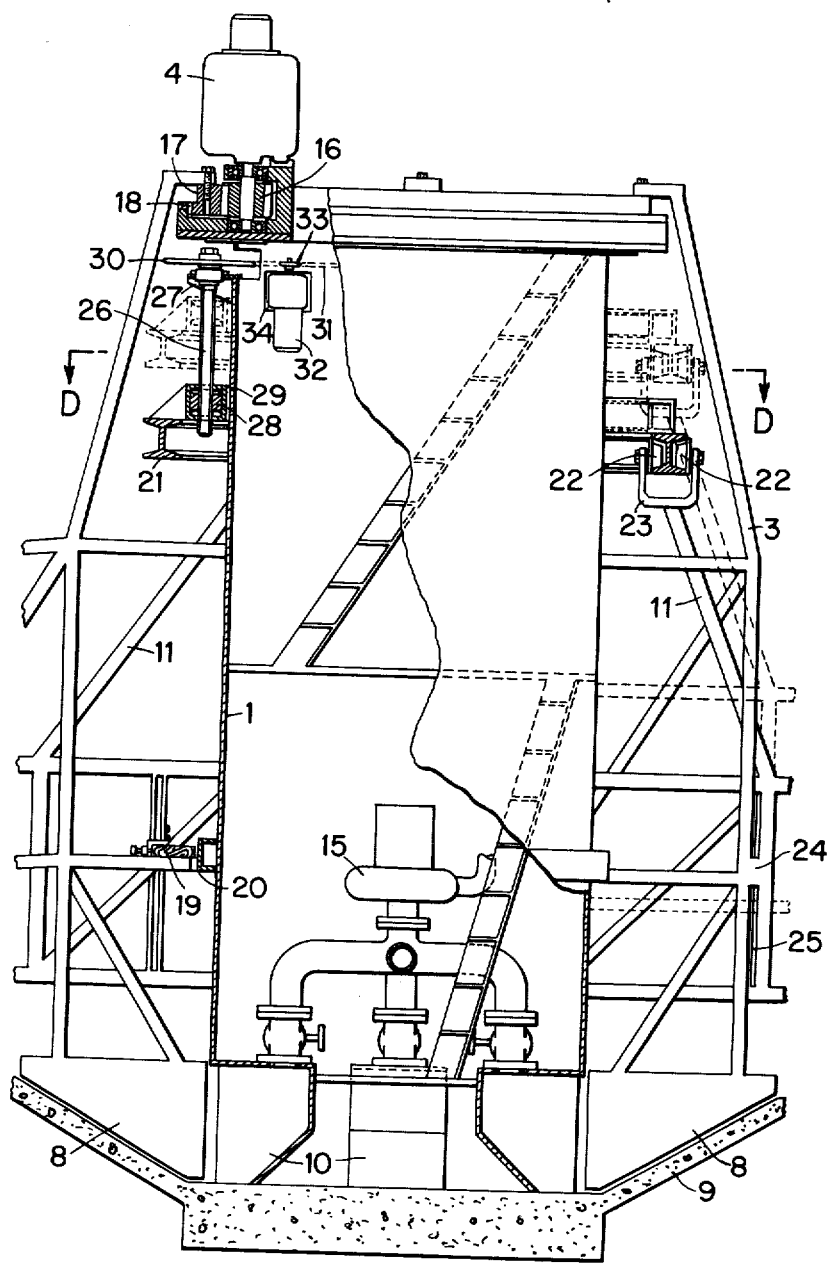
FIG. 5 is a side view of the central column of the thickener of FIG. 1 partly in section along line C—C in FIG. 6.
Figure 6:
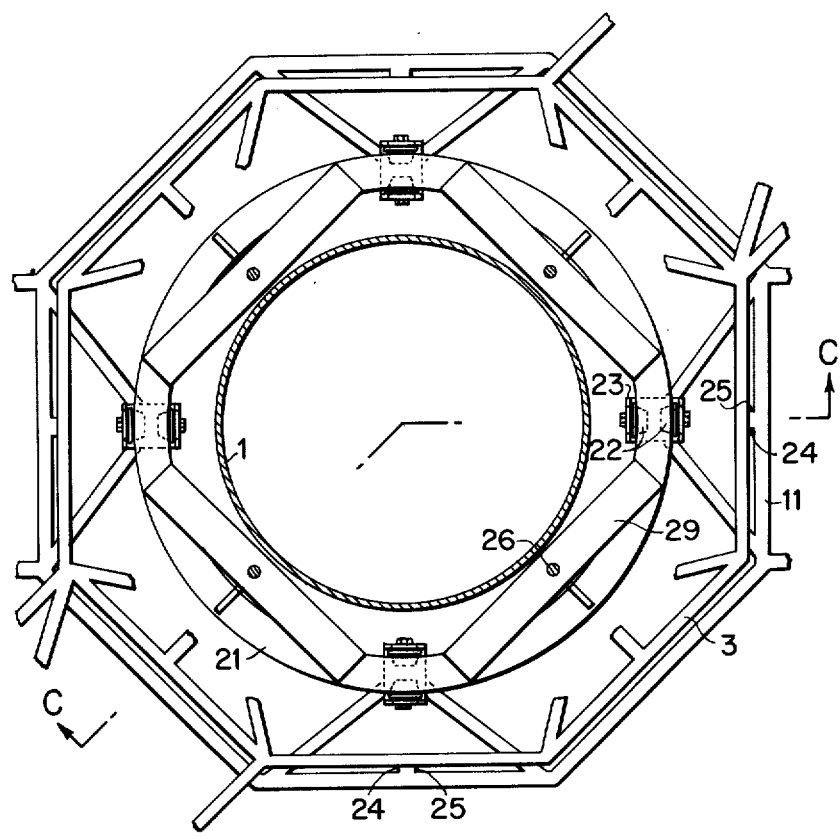
FIG. 6 is a plan view of the central column of FIG. 5 partly in section along lilne D—D of FIG. 5.
Figure 8:
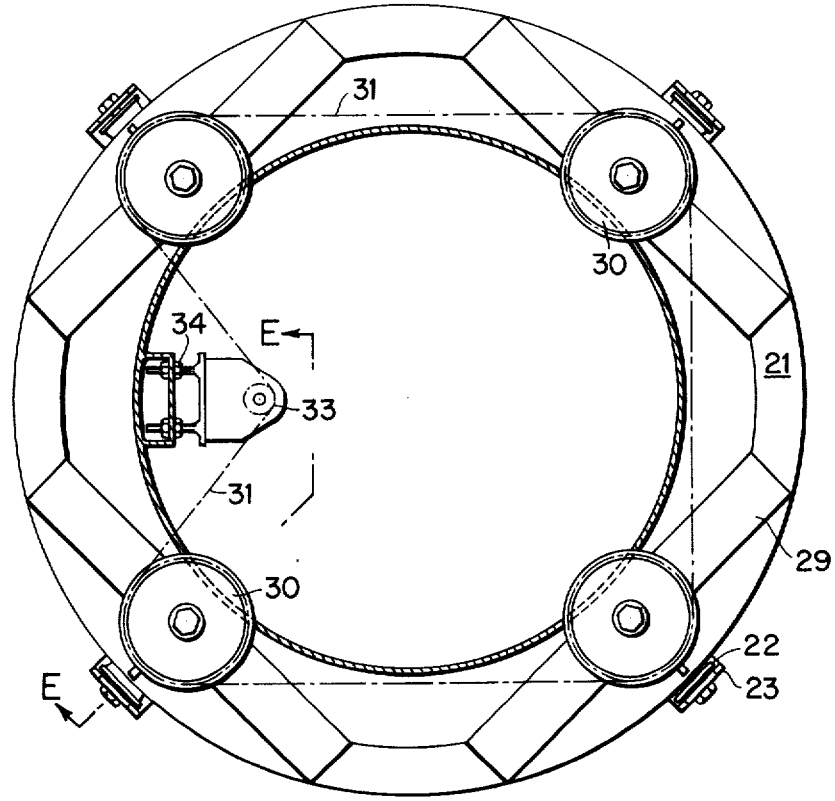
FIGS. 7 and 8 show in sectional side view (along line E—E of FIG. 8) and plan view respectively structural details of the raising and lowering mechanism for the shorter rake arms.
Figure 7:
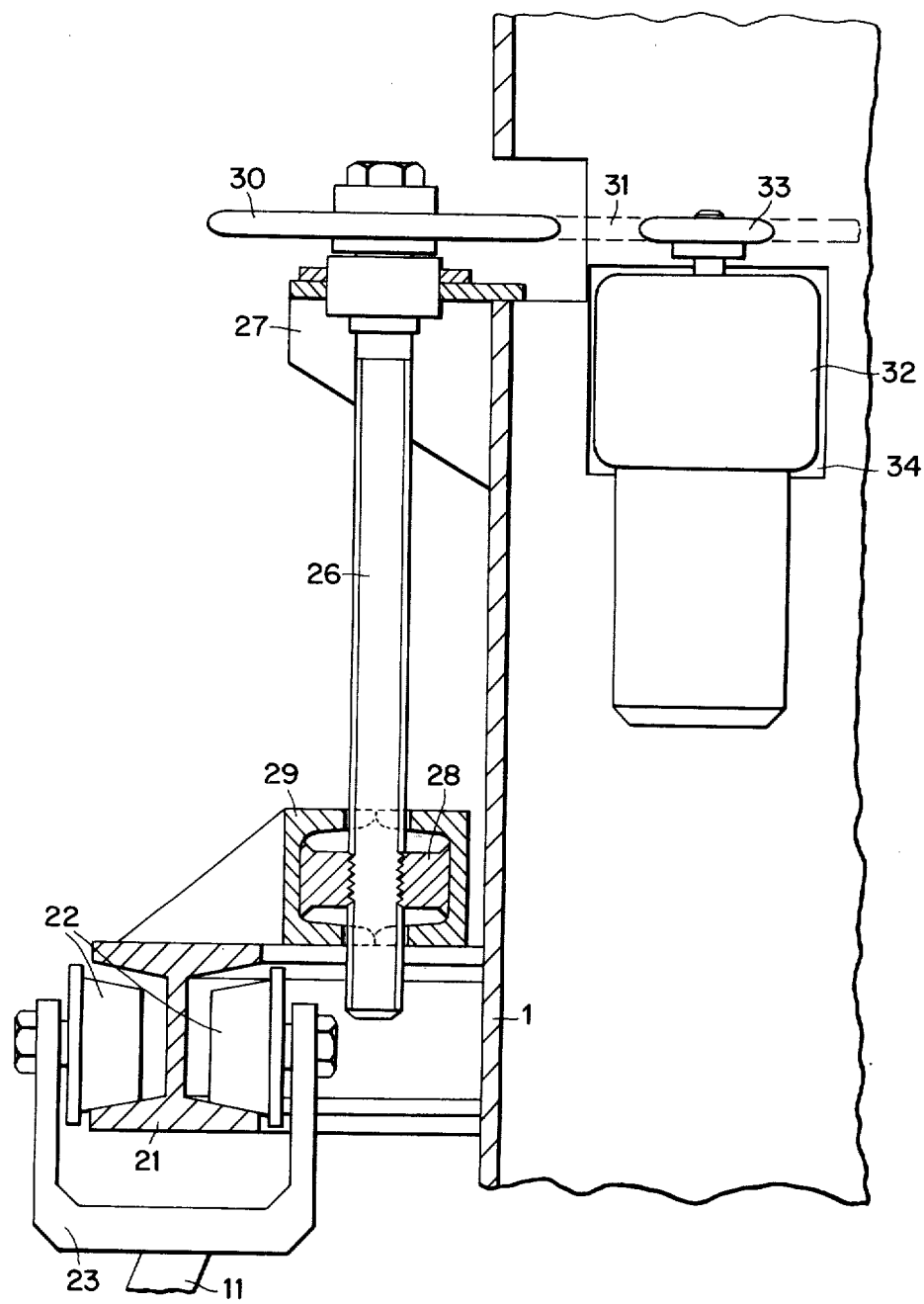

The lifting and lowering of the monorail beam 21 can best be seen in FIGS. 7 and 8 although FIG. 5 shows the lifted position of cage 11 in dotted lines.

The monorail beam 21 is supported on four lifting screws 26 which are rotatably mounted in brackets 27 fixed to the centre column 1, and engage lifting nuts 28 housed in channels 29 fixed to the monorail beam 21. Thus by rotating the lifting screws 26 the monorail beam 21 may be lifted and lowered as required to lift or lower the cage 11 with its rake arms 12 and 13 as shown in FIGS. 4 and 3 respectively.

In order to rotate all lifting screws simultaneously they are each equipped with a sprocket wheel 30 at their upper ends and all these sprocket wheels 30 are linked by chain 31 driven by an electric lifting motor 32 with pinion 33. This lifting motor 32 is mounted on the inner wall of centre column 1 for example by means of a bracket 34, as shown in FIG. 8.

Thus, whenever the scraper blades 14 on the rake arms 12 and 13 strike an obstruction on the bottom of the settling tank 2, the electric lifting motor 32 will be started, for example by automatic sensing means, and will rotate simultaneously all lifting screws 26 so as to lift the blades 14 over the obstruction. Thereafter the blades can be lowered again by reversing the direction of rotation of motor 32 and thus pinion 33. If necessary a gear train may be inserted between motor 32 and pinion 33.

It must be understood that the suspension of the lifting cage 11 can be reversed by mounting the brackets 23 with the roller pairs 22 on the lifting screws 26 and fixing instead the circular monorail beam 21 to the upper end of cage 11. In each case the cage 11 can freely rotate together with cage 3 and is axially adjustable thereto.

Instead of the mechanically operated lifting screws hydraulically operated cylinder and piston devices may be employed.

The foregoing description of one embodiment of the invention is not to be considered as restricting the invention thereto and modifications in the construction of the centre column thickener can be made without departing from the scope of the invention.

We claim:

1. A thickener mechanism of the central column type having a plurality of rake arms with scraper blades attached thereto for raking the contents in a settling tank on rotation of said rake arms around said central column, said mechanism comprising a first cage supporting a first set of rake arms and being rotatable on said central column, driving means for said first cage, a second cage supporting a second set of rake arms, said second cage encircling said first cage, said first cage having a plurality of grooved driving slides extending parallel to its axis of rotation and being evenly spaced around its outer circumference, said second cage having inwardly extending driving blocks evenly spaced around its inner circumference corresponding to said driving slides and in engagement therewith to couple said first cage with said second cage for rotation in unison, said second cage being slideable relative to said first cage along its vertical axis, said first set of rake arms extending to the wall of said settling tank and supporting at their outer portions a plurality of scraper blades to cover the outer annular region of said tank, said second set of rake arms being shorter than said first set and supporting a plurality of scraper blades to cover the inner region of said settling tank, and means to lift said second cage, when the scraper blades of said second set of rake arms encounter an obstancle on rotation of said cages.

2. A thickener mechanism as claimed in claim 1 for a settling tank having a conical centre part, wherein said first cage supports at its lower end a plurality of evenly angularly displaced cone scraper blades.

3. A thickener mechanism as claimed in claim 1 wherein the second set of rake arms is angularly offset relative to said first set of raked arms by an angle between 30° and 90°.

4. A thickener mechanism of the central column type having a plurality of rake arms with scraper blades attached thereto for raking the contents in a settling tank having a conical centre part on rotation of said rake arms around said central column, said mechanism comprising a first cage supporting a first set of rake arms and a plurality of evenly angularly displaced cone scraper blades and being rotatable on said central column, driving means for said first cage, a second cage encircling said first cage and supporting a second set of rake arms angularly offset to said first set of rake arms by an angle between 30° and 90° and being coupled to said first cage for rotational movement therewith by driving blocks on said first cage and driving slides on said second cage mutually engaging each other and being slidable relative to each other in a vertical direction, said first set of rake arms extending to the wall of said settling tank and supporting at their outer portions a plurality of scraper blades to cover the outer annular region of said tank, said cone scraper blades moving over the conical centre part of the tank and second second set of rake arms being shorter than said first set and supporting a plurality of scraper blades to cover the inner region of said settling tank, and means to lift said second cage, when the scraper blades of said second set of rake arms encounter an obstacle on rotation of said cages.

5. A thickener mechanism as claimed in claim 4 wherein the second cage is suspended from the top of the column by a circular monorail beam being engaged by a plurality of roller pairs mounted on the column and cage respectively.

6. A thickener mechanism as claimed in claim 5 wherein a plurality of lifting screws are mounted on and evenly distributed around the periphery of the central column, said lifting screws being provided with sprocket wheels, said sprocket wheels being connected with a driving source by a chain for simultaneous rotation of all lifting screws.

7. A thickener mechanism as claimed in claim 6 wherein the monorail beam is suspended from the lifting screws and the roller pairs engaging said monorail beam are arranged annularly displaced on the upper end of the second cage.

8. A thickener mechanism as claimed in claim 6 wherein the monorail beam is secured to the upper end of the second cage and the paris of rollers engaging the monorail beam are arranged on he lifting screws.

* * * * *